United States Patent
Ellis

[15] 3,676,473
[45] July 11, 1972

[54] PROCESS FOR PREPARING ORGANIC ACIDS

[72] Inventor: Alan F. Ellis, Murrysville, Pa.
[73] Assignee: Gulf Research & Development Company, Pittsburgh, Pa.
[22] Filed: Oct. 7, 1969
[21] Appl. No.: 864,550

[52] U.S. Cl. .................................260/413, 260/533 R
[51] Int. Cl. ..........................................C07c 51/32
[58] Field of Search......................260/533 R, 413

[56] References Cited

UNITED STATES PATENTS

| | | | |
|---|---|---|---|
| 3,346,631 | 10/1967 | Boyer et al. | 260/533 R |
| 3,362,971 | 1/1968 | Mitchell | 260/533 R |

FOREIGN PATENTS OR APPLICATIONS 880,433  10/1961  Great Britain .....................260/533 R

*Primary Examiner*—Lorraine A. Weinberger
*Assistant Examiner*—Richard D. Kelly
*Attorney*—Meyer Neishloss, Deane E. Keith and Joseph J. Carducci

[57] ABSTRACT

A process for converting an alpha olefin to an organic carboxylic acid having one less carbon than the olefin which involves subjecting the alpha olefin to metathesis conditions to obtain an internal olefin having two less than twice the carbon number of the alpha olefin charge and thereafter subjecting the internal olefin so obtained to ozonolysis and oxidation to obtain the desired organic carboxylic acid.

9 Claims, No Drawings

PROCESS FOR PREPARING ORGANIC ACIDS

This invention relates to a process for converting an alpha olefin to an organic carboxylic acid having one less carbon than said olefin.

The first step involves converting, by metathesis, an alpha olefin, or a mixture of alpha olefins, to a product containing a mixture of olefins of higher and lower carbon number than the olefin charge, which comprises contacting the olefin charge with a metathesis catalyst. By "metathesis" I mean to include a process wherein molecules of olefin, the same or different, in the presence of a catalyst and under controlled reaction conditions, interact in a manner such that an olefinic fragment thereof reacts with another olefinic fragment to produce olefins containing combinations of such olefinic fragments. Metathesis as defined herein can be illustrated by the following reaction:

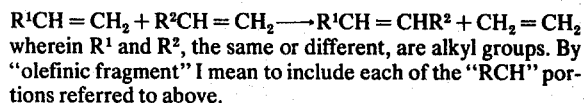

wherein $R^1$ and $R^2$, the same or different, are alkyl groups. By "olefinic fragment" I mean to include each of the "RCH" portions referred to above.

In general at least about 50 percent, and in a preferred situation, at least about 70 percent of the alpha olefin charge is converted to the internal olefin having two less than twice the carbon number of the olefin charge. During the metathesis reaction some isomerization of some of the normal alpha olefin charge may occur, and in such case when cleavage occurs at the double bond of the isomerized olefins, resulting in the formation of some additional olefinic fragments, metathesis of such additional olefinic fragments can result in the formation of additional internal olefins having carbon numbers different from the desired internal olefin illustrated above.

The olefin charge employed herein will have from four to 12 carbon atoms, preferably from six to 10 carbon atoms. Of these normal alpha olefins are preferred. Branched alpha olefins can be used, but the branching must be at least one carbon removed from the olefinic bond. Examples of such olefins are butene-1, hexene-1, octene-1, decene-1, dodecene-1, hexene-2, octene-2, 3-methylpentene-1, 4-methyloctene-2, etc.

The metathesis reaction can be effected simply by bringing the olefin charge in contact with any conventional metathesis reaction catalyst. A preferred metathesis catalyst is defined in application Ser. No. 821,945, filed May 5, 1969, in the names of Alan F. Ellis and Edward T. Sabourin and assigned to the same assignee as the present application, and contains essentially alumina, about 4 to about 12 percent by weight of molybdenum or rhenium and about 0.1 to about 6 percent by weight of silver or copper. Another metathesis catalyst that can be used contains essentially alumina, about one to about four percent by weight of cobalt, about 4 to about 12 percent by weight of molybdenum and about 0.1 to about 6 percent by weight of silver or copper. Still another metathesis catalyst which can be employed herein is one similar to those defined above but wherein silver or copper are replaced with about 0.5 to about 3 percent by weight of an alkali metal, such as sodium or potassium.

The metathesis reaction can be carried out in any conventional manner and over a wide range of variables. For example, as set forth in application Ser. No. 821,945, referred to above, the olefin charge in liquid form, can be passed over the defined catalyst at a liquid hourly space velocity (liquid volume of olefin feed per volume of catalyst per hour) of about 60 to about 0.2, preferably about 3.0 to about 0.5. The temperature during such treatment is about 90° to about 250° C., preferably about 100° to about 200° C. The pressure is not critical but is desirably low, preferably sufficient to maintain the charge in the reaction system in the liquid phase. Thus, the pressure can be from about 0 pounds to about 500 pounds per square inch gauge, preferably from about 0 to about 100 pounds per square inch gauge. If the above procedure is operated in batch, the same conditions defined above can be used and contact or reaction time can be from about 10 minutes to about 240 minutes, preferably from about 30 minutes to about 120 minutes. The reaction is preferably carried out in the absence of solvents, but if solvents are used they should not adversely affect the course of the reaction nor react with the components of the reaction system but should have a boiling point sufficiently different from that of any of the components present in the reaction system. Thus, nonpolar solvents, such as hexane, cetane, decane, etc., can be used. The amount of solvent would be that amount sufficient to maintain the contents of the reaction system in the liquid phase. Thus, on a volume base one volume of solvent per volume of reaction mixture can be used.

Preferably during the process vaporous products, for example, ethylene, are removed from the reaction zone as made. At the end of the reaction period any vaporous products still present are flashed off from the reaction product and the remaining product separated from catalyst in any convenient manner, for example, by filtration or decantation. The individual components of the reaction mixture can then be recovered from the reaction mixture by fractionation by conventional means.

In the second step of the process the desired internal olefin obtained in the first stage, or any combination of internal olefins so obtained, are subjected to ozonolysis following any conventional procedure. Thus, for example, a stream of gas containing molecular oxygen, such as oxygen itself, and from about 0.5 to about 6, or even higher, but preferably about 2 to about 3 percent, by weight of ozone relative to oxygen is passed continuously through the olefin charge dissolved in a suitable solvent, for example, a carboxylic acid having from two to 10 carbon atoms, such as acetic acid, propionic acid, heptanoic acid and decanoic acid, or an alcohol having from one to six carbon atoms, such as methanol, propanol-1, and hexanol-1, at such a rate so that the exit stream will be substantially free of ozone, continuing until some ozone is found in the exit gas, at which time the ozonolysis reaction will have terminated. Since ozonolysis is substantially instantaneous, the time of contact depends upon obtaining suitable contact between ozone and an unreacted olefin. The temperature can be from about 0° to about 35° C., preferably about 10° to about 20° C., and while pressures as high as about 50 pounds per square inch gauge can be employed atmospheric pressure is preferred. As a result of ozonolysis cleavage of the double bond results and the fragments so obtained react with ozone and are believed to form aldehydes and hydroperoxides.

In the third stage of the process the reaction product obtained from ozonolysis is subjected to oxidation with a gas containing molecular oxygen, preferably air. Any effective method which insures contact between the ozonolysis product and oxygen can be used. In a preferred embodiment air is continuously passed through the ozonolysis product and this is preferably continued until there is no noticeable reduction in oxygen content of the exit stream. The amount of oxygen stoichiometrically needed, relative to the ozonolysis product, on a molar basis, must be at least about 1:1, but in general from about 5:1 to about 100:1, is used. Temperatures of about 70° to about 150° C., preferably about 80° to about 105° C., can be used. Pressures as high as about 100 pounds per square inch gauge can be employed, but in general atmospheric pressure is preferred. A reaction time of about 0.5 to about 2 hours will generally suffice. As a result of the oxidation step it is believed the aldehydes are oxidized and the hydroperoxides are rearranged to organic carboxylic acids having a carbon number identical to the olefinic fragment in the ozonolysis product. Recovery of the organic carboxylic acids from the reaction mixture can be effected in any desired manner, but in general fractional distillation is preferred.

The process of this invention can further be illustrated by the following.

EXAMPLE I

Oxygen gas containing about two percent by weight of ozone was passed at the rate of 0.9 liter per minute through a solution of 20 grams of octene-1 in 80 grams of propionic acid in a 200-milliliter flask equipped with a stirrer, gas sparger and condenser at between 5° and 10° C. until unreacted ozone was detected in the effluent gas. During the early part of the ozonolysis step a fog of entrained light reactants were formed and were carried out of the system. The resulting solution of ozonized olefin was then heated to a temperature of 95° to 105° C. in the same system with an oxygen flow of one liter per hour for 60 minutes to produce 108.8 grams of crude product, which was washed with water to remove solvent and light products therefrom. Analysis of the resulting product by gas chromatography showed efficiencies of 1.9 percent to hexanoic acid and 98.1 percent to heptanoic acid for a total $C_6$ to $C_7$ acid product of 22.6. The formic acid formed was not analyzed.

EXAMPLE II

EXAMPLE I was repeated except that 20 grams of tetradecene-7 was employed in place of octene-1. The tetradecene-7 was obtained as follows: Octene-1 was passed at a feed rate of 75 milliliters per hour upwardly through a fixed bed of catalyst, amounting to 75 milliliters and consisting of 2.5 weight percent of silver and eight weight percent of molybdenum on alumina, at a temperature of 120° C. and atmospheric pressure. The effluent was subjected to distillation to recover tetradecene-7 therefrom. Conversion of octene-1 was about 35 percent with selectivity to tetradecene-7 of 80 percent. No fogging was observed during the ozonolysis step. The crude product obtained amounted to 109.1 grams. Efficiency to hexanoic acid was 4.4 percent, to heptanoic acid 95 percent and to octanoic acid 0.6, for a total $C_6$ to $C_8$ acid product of 24.1 grams.

The advantage of operating in accordance with the process described and claimed herein is apparent from the above. In EXAMPLE I the fog that was formed during ozonolysis is believed to include ozone, light fragments such as peroxides, formic acid and formaldehyde, and some unreacted octene-1. This is a potentially explosive material and difficult to handle and to separate into its individual components. In EXAMPLE II, which was carried out in accordance with the claimed procedure, the light materials, primarily ethylene, are removed from the reaction system during metathesis. These materials at such stage are easily recoverable and can be reused. In fact, since they are removed prior to ozonolysis they will not consume ozone to form quantitative amounts of formic acid and additionally will not form undesired and potentially explosive volatile materials. As seen in EXAMPLE II, no fog was noted and desired acids formed correspond to the amount formed in EXAMPLE I.

Obviously, many modifications and variations of the invention, as hereinabove set forth, can be made without departing from the spirit and scope thereof, and therefore only such limitations should be imposed as are indicated in the appended claims.

I claim:

1. A process for converting alpha olefins to organic carboxylic acids having one less carbon than said olefins which comprises subjecting an alpha olefin to metathesis conditions to obtain a mixture of internal olefins and ethylene and thereafter subjecting at least one of the internal olefins in said mixture to ozonolysis and to oxidation with molecular oxygen to obtain the desired organic carboxylic acid.

2. The process of claim 1 wherein the olefin charge includes a normal alpha olefin having from four to 12 carbon atoms.

3. The process of claim 1 wherein the olefin charge includes a normal alpha olefin having from six to 10 carbon atoms.

4. The process of claim 1 wherein the predominant internal olefin that is formed during metathesis has two less than twice the carbon number of the alpha olefin charged.

5. The process of claim 1 wherein the alpha olefin charge includes octene-1.

6. The process of claim 1 wherein the ozonolysis is carried out at a temperature of about 0° to about 35° C.

7. The process of claim 1 wherein the oxidation is carried out at a temperature of about 70° to about 150° C.

8. The process of claim 1 wherein said metathesis is carried out in the presence of a catalyst containing essentially alumina, molybdenum and silver or copper at a temperature of about 90° to about 250° C. and a pressure of about 0 to about 500 pounds per square inch gauge, vaporous products being removed from the reaction zone during said metathesis, wherein said ozonolysis is carried out by contacting internal olefins formed during said metathesis, while the same are dissolved in a solvent, with a gas containing ozone at a temperature of about 0° to about 35° C. and pressures up to about 50 pounds per square inch gauge and wherein said oxidation is carried out by subjecting the ozonolysis product to oxidation with a gas containing molecular oxygen at a temperature of about 70° to about 150° C. and a pressure up to about 100 pounds per square inch gauge.

9. The process of claim 1 wherein said metathesis is carried out in the presence of a catalyst containing essentially alumina, cobalt, molybdenum or rhenium and silver or copper at a temperature of about 90° to about 250° C. and a pressure of about 0 to about 500 pounds per square inch gauge, vaporous products being removed from the reaction zone during said metathesis, wherein said ozonolysis is carried out by contacting internal olefins formed during said metathesis, while the same are dissolved in a solvent, with a gas containing ozone at a temperature of about 0° to about 35° C. and pressures up to about 50 pounds per square inch gauge and wherein said oxidation is carried out by subjecting the ozonolysis product to oxidation with a gas containing molecular oxygen at a temperature of about 70° to about 150° C. and a pressure up to about 100 pounds per square inch gauge.

* * * * *